United States Patent [19]
Brown

[11] 3,789,458
[45] Feb. 5, 1974

[54] HOG SKINNING II
[76] Inventor: Kenneth J. Brown, P.O. Box 2036, Plainview, Tex. 79408
[22] Filed: June 14, 1972
[21] Appl. No.: 262,527

[52] U.S. Cl. ............................................. 17/21
[51] Int. Cl. ....................................... A22b 5/16
[58] Field of Search ............................... 17/21, 50

[56] References Cited
UNITED STATES PATENTS
| 3,599,277 | 8/1971 | Brown | 17/21 |
| 3,478,386 | 11/1969 | Robison | 17/21 |
| 2,863,166 | 12/1958 | Schmidt | 17/21 |
| 3,545,037 | 12/1970 | Anderson | 17/21 |
| 3,553,767 | 1/1971 | Herzog | 17/21 |

Primary Examiner—Louis G. Mancene
Assistant Examiner—D. L. Weinhold
Attorney, Agent, or Firm—Charles W. Coffee

[57] ABSTRACT

A series of hogs are hung by their hamstrings and moved progressively along a conveyor. The skin is cut from the belly, legs and head of each hog and then heads of the hogs, by pairs, are held down while the skins of the hogs, by pairs, are pulled upward. The skins are pulled upward over a tent-shaped backing to protect the mechanical portions of the puller from blood and offal.

The skin is pulled over a double cone-shaped roller at the top so the skins are channeled to the center in this area.

7 Claims, 4 Drawing Figures

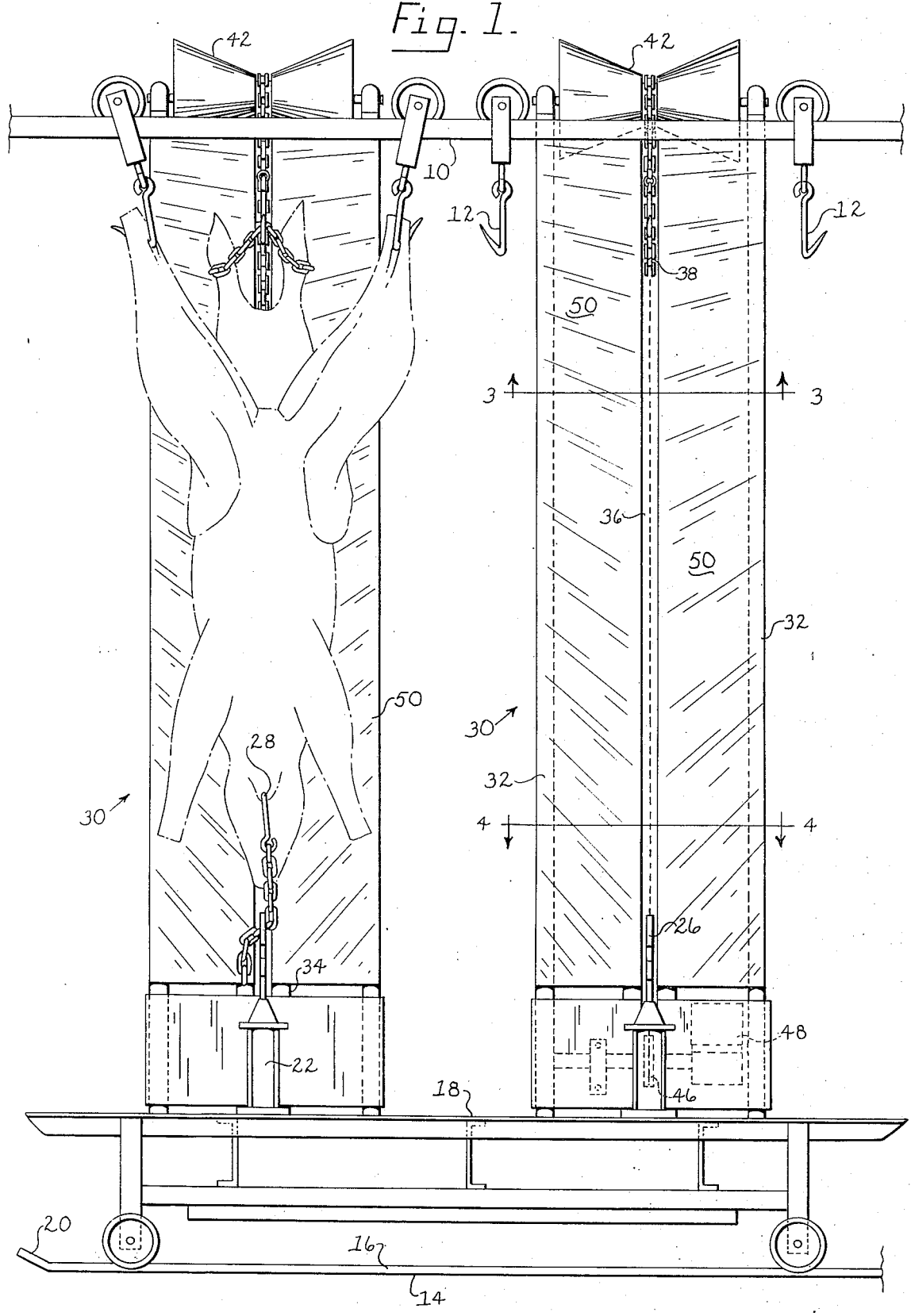

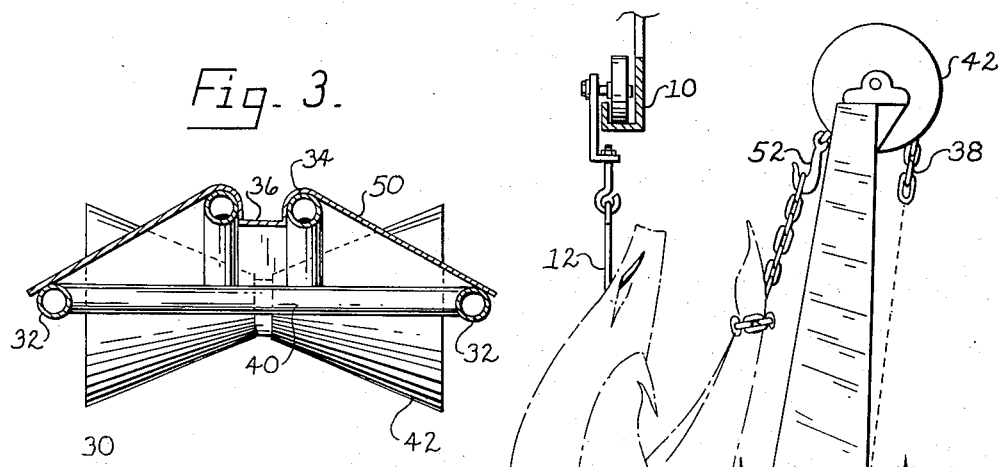
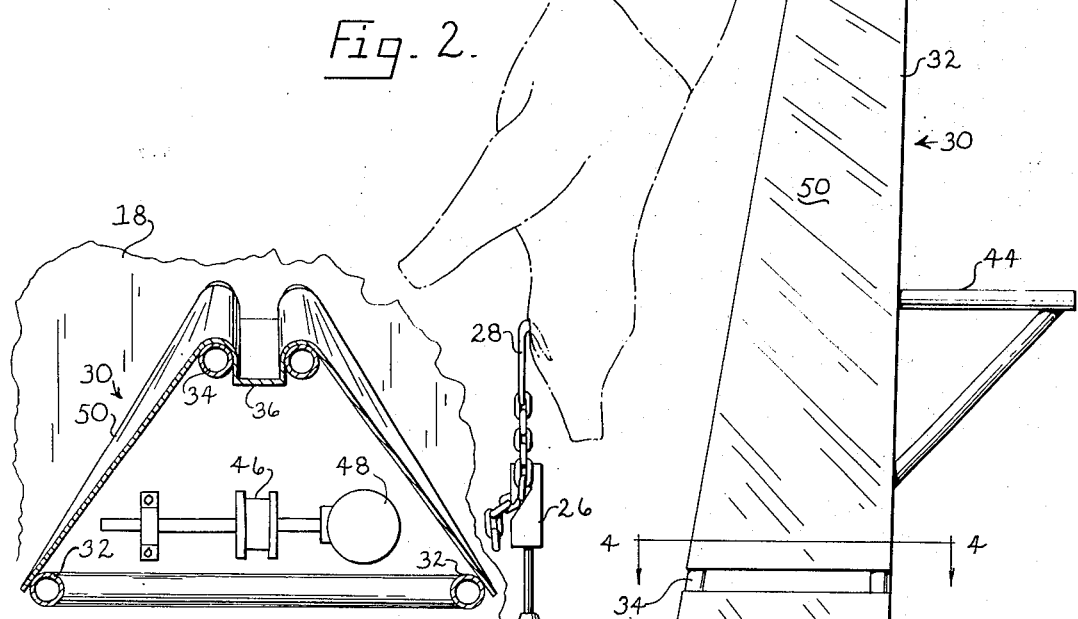
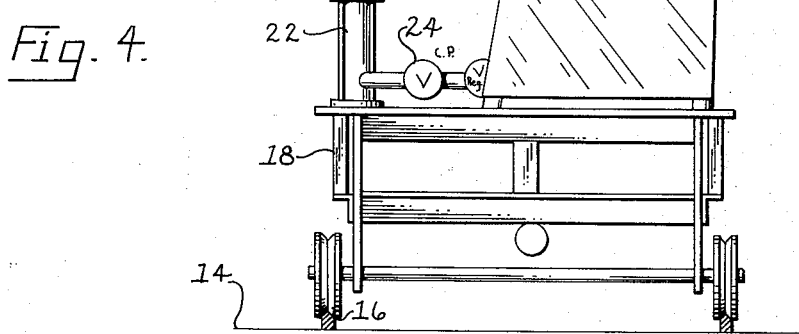

HOG SKINNING II

BACKGROUND OF THE INVENTION

1. Field of the Invention

This invention relates to butchering and more particularly to hog skinning. (17/21; 17/50)

2. Description of the Prior Art

In my prior U.S. Pats., No. 3,599,277 and No. 3,621,514, and in commercial practice, I have taught that it is desirable to hold the head of the hog down so the body is in tension while pulling the skin from the hog carcass. The pulling rack has been mounted with a single rack upon a single carriage so the hogs were skinned one at a time.

The art of record in each of my prior patents was considered in the preparation of this application and also the article Wierbicki et al.: "Russian Meat Industry," The National Provisioner, 146(11), pp. 14–18, Mar. 17, 1962.

SUMMARY OF THE INVENTION

1. New and Different Function

In order to increase production, i.e., increase the rate at which hogs are slaughtered, sometimes it is necessary to have two hog skinners. There is a certain time delay in which the head of the hog is hooked down and the pulling hooks are attached to the ears of the hog and then the hide is pulled from the hog and then disconnections made. Therefore, I have found there is a limit of about 150 carcasses per hour is about all that one skinning machine can handle.

To increase production to a limit of about 300 hogs per hour, I have found it possible to place two skinning racks upon a single carriage, each skinning rack having a head hold-down and pulling hook, pulling the skins from the hogs in tandum. Before the equipment is built, it is determined how close together the hogs will be hung on the conveyor chain and then the spacing between the two racks upon the carriage is spaced accordingly.

Also, I have found that instead of having a flat back support, it is more desirable to angle it backwards to protect the motor and other equipment from blood and offal.

In addition, sometimes the skins tend to pull to one side as they go over the top pulley; therefore, I have found it desirable to use a double-cone guide at this point.

2. Objects of this Invention

An object of this invention is to skin hogs rapidly with a maximum conservation of skins as well as assuring maximum sanitary handling of the carcasses.

Other objects are to achieve the above with a device that is sturdy, compact, durable, sanitary, simple, safe, efficient, versatile, and reliable yet inexpensive and easy to manufacture, install, adjust, operate, and maintain.

Further objects are to achieve the above with a method that is sanitary, versatile, rapid, efficient, and inexpensive, and does not require skilled people to install, adjust, operate, and maintain.

The specific nature of the invention, as well as other objects, uses, and advantages thereof, will clearly appear from the following description and from the accompanying drawing, the different views of which are not necessarily to the same scale.

BRIEF DESCRIPTION OF THE DRAWING

FIG. 1 is a front elevational view of the equipment used in this invention.

FIG. 2 is a side elevational view of equipment used in this invention with some parts schematically represented.

FIG. 3 is a sectional view of the rack taken substantially on lines 3—3 of FIGS. 1 and 2.

FIG. 4 is a sectional view taken substantially on lines 4—4 of FIGS. 1 and 2.

DESCRIPTION OF THE PREFERRED EMBODIMENT

Referring more particularly to FIG. 1 of the drawing, there may be seen the carcasses of the hogs to be hung from an overhead conveyor 10 by their hamstrings on hooks 12 running on the conveyor 10. Although it is not shown, the conveyor would be mounted from the ceiling which is to say that it is elevated above floor 14. Rails 16 are mounted in the floor 14 and carriage 18 runs on the rails 16 on the floor. As explained in my previous patents, there is a return device (not shown) to return the carriage 18 to stop 20.

The carriage 18 has mounted thereon means for skinning two hogs. The drawing shows the carcasses rather close together, however, it will be understood by those skilled in the art that spacing as between the hogs could be any distance desired, thus the length of the carriage and the spacing therefore would be adjusted accordingly.

Each unit for skinning a hog includes tension means attached to the carriage 18 for pulling the head of the hog down. Specifically, it includes tension air cylinder 22 which is supplied by air through a check valve and an operating valve and a constant pressure valve, all as fully explained in my previous patents and therefore is shown only schematically here by the numeral 24.

Tension hook 26 is attached to the ram of the air cylinder 22. Jaw hook 28 is adapted to hook into the jaw of the carcass and is attached by its chain to the tension hook 26. As stated before, there would be an air cylinder 22 for each hog skinning apparatus mounted on the carriage 18.

Also, there are two pulling means mounted on the carriage. Each of the pulling means include rack 30. Each rack has two back posts 32, each back post being at a back corner of the rack 30 which is also at the back of the carriage 18. The back posts 32 are substantially vertically oriented and they extend the full height of the rack. Forward of the back posts, approximately half the width of the carriage as illustrated, are two additional or center posts 34. The center posts 34 are very close together and a channel 36 between them forms a guide for endless pulling chain 38 carrying pulling hooks 52. The rack in the vertical section (FIGS. 3 and 4) is basically triangular in shape. I.e., the two back posts 32 form or define the angles to the base of the triangle and then between each of the back posts and the center posts 34 is formed one of the equal legs of the triangle. Crossbar 40 connects the two back posts 32 near the top of the rack 30 and the two center posts 34 and the channel 36 therebetween terminate at the crossbar 40 near the top of the rack.

Top pulley 42 is mounted at the very peak of the rack 30. As seen in FIG. 1, the top pulley 42 has a groove in the center. Each of the ends of the top pulley 42 are near the edge of the rack 30. The ends have a greater diameter so the general configuration of the top pulley 42 is that of a double cone as shown. Therefore, the hides being pulled off the carcasses will be guided over the top pulley 42 at the center and they will not slide to one side or the other. After the hides are pulled over the top pulley 42, they fall upon shelf 44 on the backside of the rack 30. As fully explained in my prior patents, the endless pulling chain 38 extends over the top pulley 42 and bottom pulley 46 which is driven by motor 48. Sheetmetal 50, preferably stainless steel, extends across the equal legs of the triangle, i.e., it extends from each center post 34 to one of the back posts 32. As seen in the drawing, the sheetmetal forms a tent or shield or guide so any blood or offal is directed away from the bottom pulley 46 and the motor 48.

Thus it may be seen that I have provided equipment to meet the objectives set out above.

The embodiment shown and described above is only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

I claim as my invention:

1. In an apparatus for skinning hogs in a slaughter house including
   a. a conveyor from which the carcasses of the hogs may be movingly hung by their hamstrings,
   b. said conveyor elevated above the floor,
   c. a carriage mounted on the floor for movement parallel to the conveyor,
   d. tension means attached to the carriage for pulling the head of each hog down, and
   e. pulling means mounted on the carriage for movement along the direction of the tension means and the conveyor chain for pulling the hide from each carcass, said pulling means including:
      i. an upstanding rack mounted on the carriage,
      ii. an endless chain extending over the rack trained over a top pulley at the top and a bottom pulley at the bottom, and
      iii. a hook mounted on said endless chain;
   f. the improvement comprising in combination
   g. said top pulley having a groove in the center,
   h. said endless chain riding in said groove,
   j. said top pulley extending approximately to the sides of the rack on either side of the groove,
   k. said top pulley being of larger diameter on each end next to the edge of the rack than it is in the center next to the groove,
   m. so that the top pulley is double-coned shape and the hides pulled over the pulley by the hook will be guided to the center of the top pulley by the shape thereof.

2. The invention as defined in claim 1 with additional limitations of
   n. said rack having two substantially vertically oriented back posts extending from the carriage on the backsides thereof for the full height of the rack, and
   o. two additional center posts extending from the carriage along the center of the rack on either side of said endless chain,
   p. said two center posts being close together adjacent to the chain and thus one another,
   q. so that in cross section the rack is approximately an equalateral triangle with two back posts defining the angles of the base and the center posts with one of the back posts define one of the equilateral legs, and
   r. a sheetmetal shield extending over each equilateral leg which is to say from one of the back posts to one of the center posts so that it forms an angled shield and guide.

3. The invention as defined in claim 1 with additional limitations of
   n. two of said pulling means mounted on said carriage,
   o. said pulling means spaced along said carriage
   p. so that both are adapted to be oriented to a hog carcass on the conveyor, and
   q. each pulling means having an associated tension means as defined above.

4. In an apparatus for skinning hogs in a slaughter house including
   a. a conveyor from which the carcasses of the hogs may be movingly hung by their hamstrings,
   b. said conveyor elevated above the floor,
   c. a carriage mounted on the floor for movement parallel to the conveyor,
   d. tension means attached to the carriage for pulling the head of each hog down, and
   e. pulling means mounted on the carriage for movement along the direction of the tension means and the conveyor chain for pulling the hide from each carcass, said pulling means including:
      i. an upstanding rack mounted on the carriage,
      ii. an endless chain extending over the rack trained over a top pulley at the top and a bottom pulley at the bottom, and
      iii. a hook mounted on said endless chain;
   f. the improvement comprising in combination
   g. said rack having two substantially vertically oriented back posts extending from the carriage on the backside thereof for the full height of the rack, and
   h. two additional center posts extending from the carriage along the center of the rack on either side of said endless chain,
   j. said two additional center posts being close together adjacent to the chain and thus one another,
   k. so that in cross section the rack is approximately an equalateral triangle with the two back posts defining the angles of the base and the center posts with one of the back posts defining one of the equilateral legs, and
   m. a sheetmetal shield extending over each equilateral leg which is to say from one of the back posts to one of the center posts so that it forms an angled shield and guide.

5. The invention as defined in claim 4 with additional limitations of
   n. two of said pulling means mounted on said carriage,
   o. said pulling means spaced along said carriage
   p. so that both are adapted to be oriented to a hog carcass on the conveyor, and q. each pulling means having an associated tension means as defined above.

6. In an apparatus for skinning hogs in a slaughter house including
   a. a conveyor from which the carcasses of the hogs may be movingly hung by their hamstrings,
   b. said conveyor elevated above the floor,
   c. a carriage mounted on the floor for movement parallel to the conveyor,
   d. tension means attached to the carriage for pulling the head of each hog down, and
   e. pulling means mounted on the carriage for movement along the direction of the tension means and the conveyor chain for pulling the hide from each carcass, said pulling means including:
      i. an upstanding rack mounted on the carriage,
      ii. an endless chain extending over the rack trained over a top pulley at the top and a bottom pulley at the bottom, and
      iii. a hook mounted on said endless chain;
   f. the improvement comprising in combination
   g. two of said pulling means mounted on said carriage,
   h. said pulling means spaced along said carriage
   j. so that both are adapted to be oriented to a hog carcass on the conveyor, and
   k. each pulling means having an associated tension means as defined above.

7. The invention as defined in claim 6 with additional limitations of
   m. said top pulley having a groove in the center,
   n. said endless chain riding in said groove,
   o. said top pulley extending approximately to the sides of the rack on either side of the groove,
   p. said top pulley being of larger diameter on the end next to the edge of the rack than it is in the center next to the groove,
   q. so that the top pulley is double-coned shape and the hides pulled over the pulley by the hook will be guided to the center of the top pulley by the shape thereof,
   r. said rack having two substantially vertically oriented back posts extending from the carriage on the backsode thereof for the full height of the rack, and
   s. two additional center posts extending from the carriage along the center of the rack on either side of said endless chain,
   t. said two additional center posts being close together adjacent to the chain and thus one another,
   u. so that in cross section the rack is approximately an equalateral triangle with the two back posts defining the angles of the base and the center posts with one of the back posts define one of the equalateral legs, and
   v. a sheetmetal shield extending over each equilateral leg which is to say from one of the back posts to one of the center posts so that it forms an angled shield and guide.

* * * * *